Figure 1:
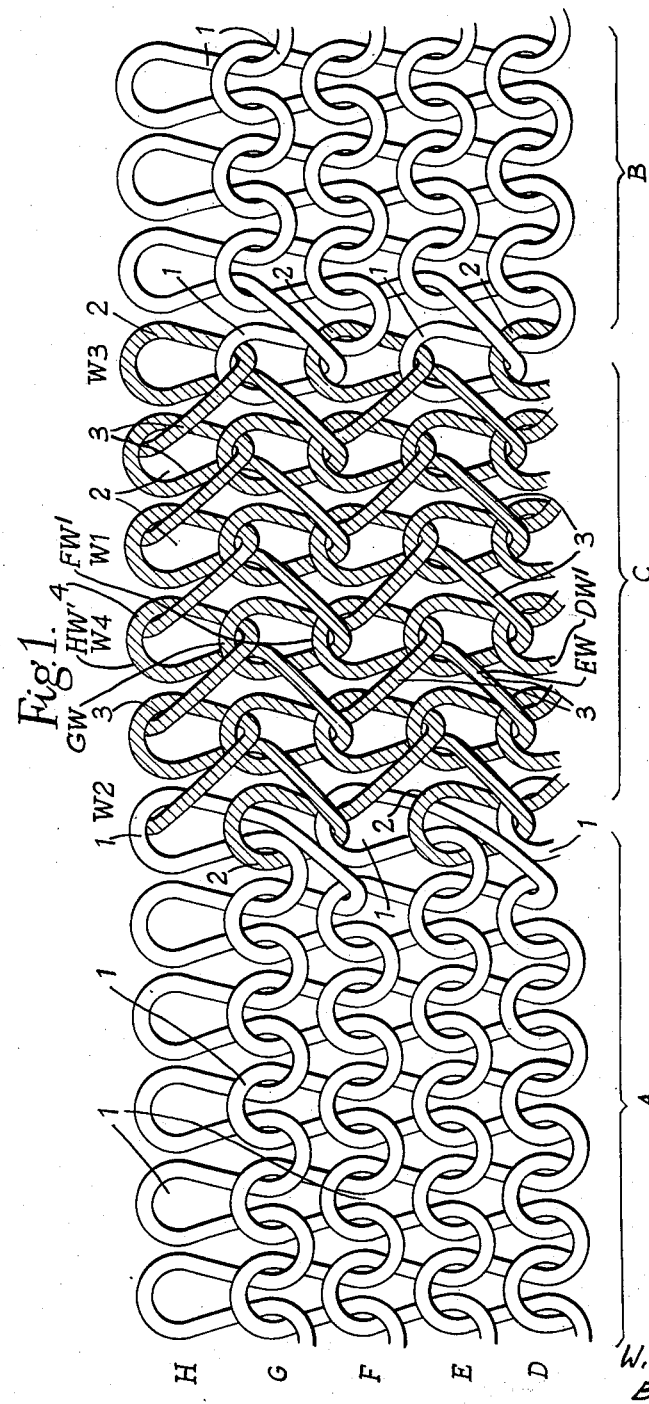

Aug. 18, 1959 W. B. A. ATTENBOROUGH 2,899,812
KNITTED FABRICS OR ARTICLES
Filed July 14, 1955 6 Sheets-Sheet 2

INVENTOR
W.B.A. Attenborough
BY
Richards & Geier
ATTORNEYS

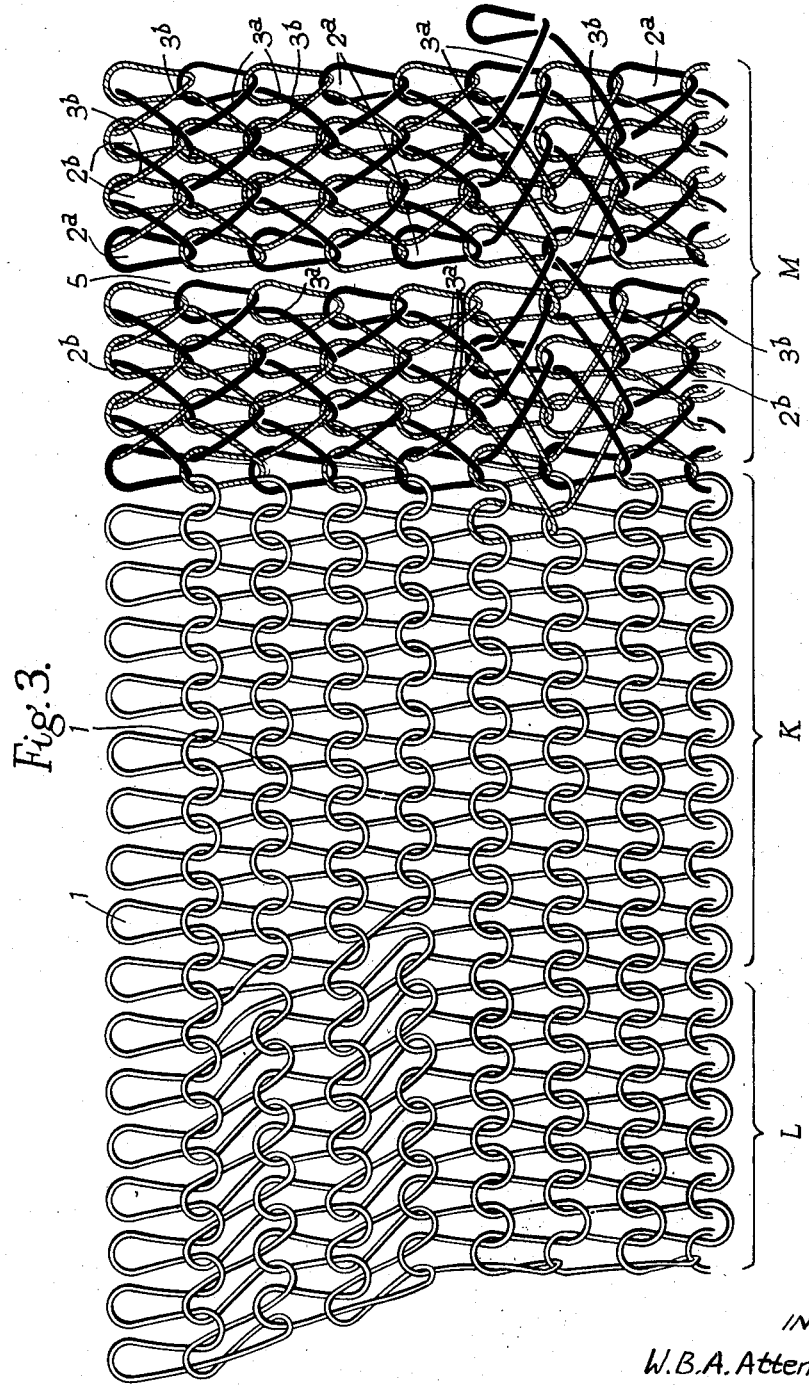

Aug. 18, 1959    W. B. A. ATTENBOROUGH    2,899,812
KNITTED FABRICS OR ARTICLES
Filed July 14, 1955    6 Sheets-Sheet 4
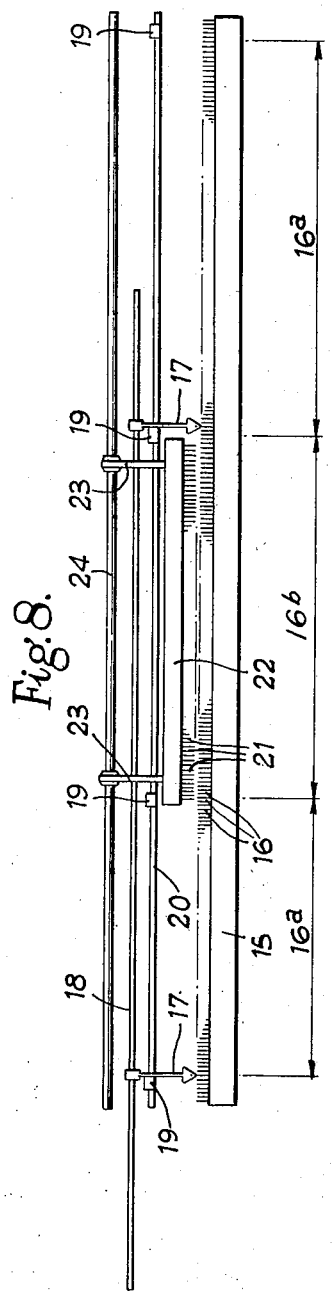
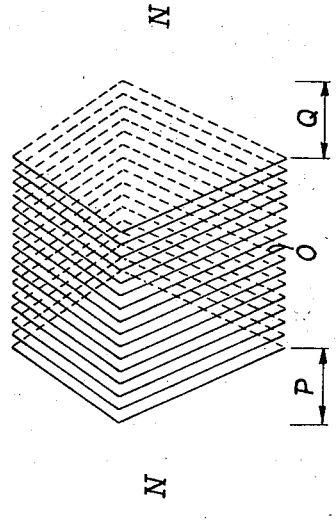
INVENTOR
W.B.A. Attenborough
BY
ATTORNEYS Aug. 18, 1959    W. B. A. ATTENBOROUGH    2,899,812
KNITTED FABRICS OR ARTICLES
Filed July 14, 1955    6 Sheets-Sheet 5
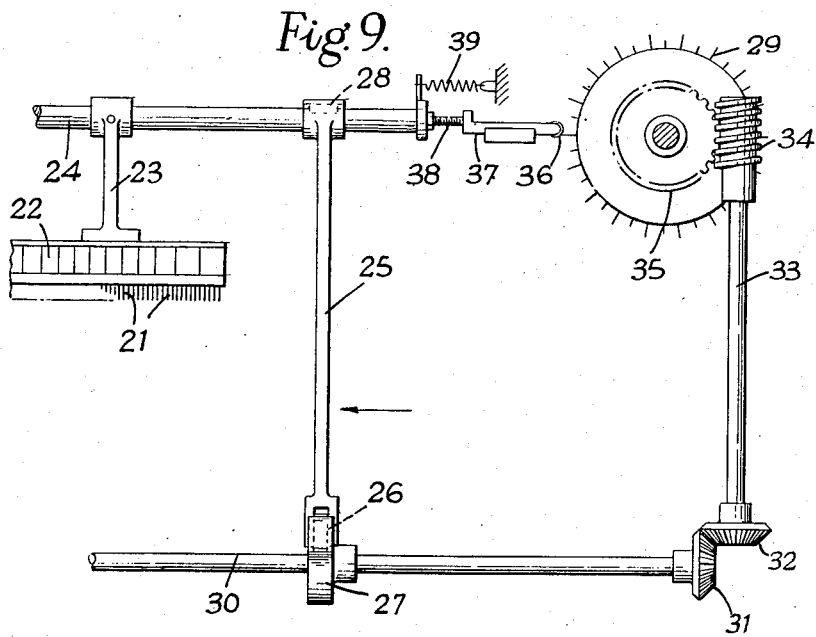
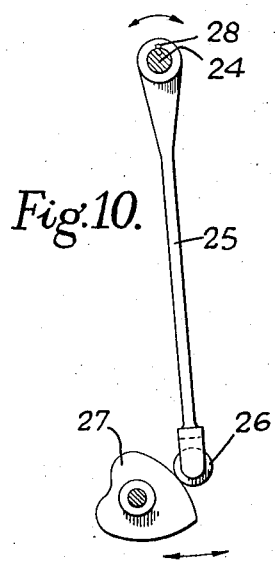
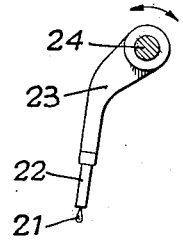
INVENTOR
W.B.A. Attenborough
BY
Richerdy Geier
ATTORNEYS United States Patent Office 2,899,812
Patented Aug. 18, 1959

2,899,812

KNITTED FABRICS OR ARTICLES

Walter Bruce Arnold Attenborough, Leicester, England

Application July 14, 1955, Serial No. 522,125

Claims priority, application Great Britain
July 15, 1954

5 Claims. (Cl. 66—169)

This invention has for its principal object to provide a knitted fabric of a generally improved structure which although incorporating contrastingly coloured coursewise adjoining portions is characterised by the complete absence of coursewise extending floats of yarn or thread.

The improved fabric structure, moreover, is such as to provide the possibility of producing a wide variety of attractive patterns and designs in a particularly simple and novel manner, as will be hereinafter described.

The invention also includes the method of producing the improved knitted fabric.

The expression "knitted fabric" adopted herein for convenience is used in a generic sense and is intended to include, where the context so admits, not only fabric in the piece but also knitted articles such, for instance, as jackets, cardigans, jumpers, slip-overs, sweaters and similar finished garments.

Broadly considered, the knitted fabric constituting this invention comprises weft knitted and warp knitted portions or areas in coursewise adjoining relation.

Advantageously, and to achieve the aforementioned primary object, the adjoining weft and warp knitted portions or areas may be knitted of contrastingly coloured yarns or threads (hereinafter for convenience referred to simply as "threads") whereby solid colour effects akin to "intarsia" designs are produced. In this regard, coursewise adjoining weft and warp knitted portions are areas of, say, two contrasting colours may, for example, be disposed in alternating relation. There is, however, no limitation in this respect since the fabric may have portions or areas of more than two colours disposed in any desired appropriate relation.

At the places where the portions or areas of weft and warp knitting adjoin, loops of the two types of knitting may conveniently overlap to the extent of only a single needle wale. In appropriate cases, however, the overlap may be increased. Accordingly, where alternate portions of fabric are of a colour contrasting with the colour or colours of intervening portions, there will, as in the case of intarsia work, be no coursewise extending floats connecting portions of the same colours.

But over and above this, an important advantage of the improved structure is that within the confines of a warp knitted portion or area, spaced, e.g. alternate, wales can be of a colour contrasting with that of intervening wales, without any coursewise extending floats connecting wales of the same colours. A consequential advantage is that it is unnecessary to knit up floating yarns or threads on rib needles as in jacquard designing. Moreover, the invention enables vertical or like striping effects to be produced on fashioned outerwear or on similar knitted articles cut to shape without the knitted structure losing its inherent elasticity since there are no restricting floats.

By arranging for warp knitted wales to assume various angular dispositions with respect to the weft knitted wales, zig-zag effects can be produced.

The method of making the improved fabric accordingly consists in supplying a weft thread to at least one group of consecutive needles of a set, simultaneously lapping needles of an adjoining group of the set with individual warp threads, ensuring that one of the needles at the location where the groups adjoin is supplied with either the weft thread or a warp thread or both, and causing the needles to knit, this sequence being repeated at each of a plurality of courses of knitting. In other words, the method consists in knitting warp and weft threads on respectively adjoining groups of needles, the weft thread not being knitted on needles where the warp threads are knitted—except for a possible overlap of one or more needles. In practice, of course, there would usually be spaced groups of needles knitting weft threads and intervening groups knitting warp threads.

Figure 2:
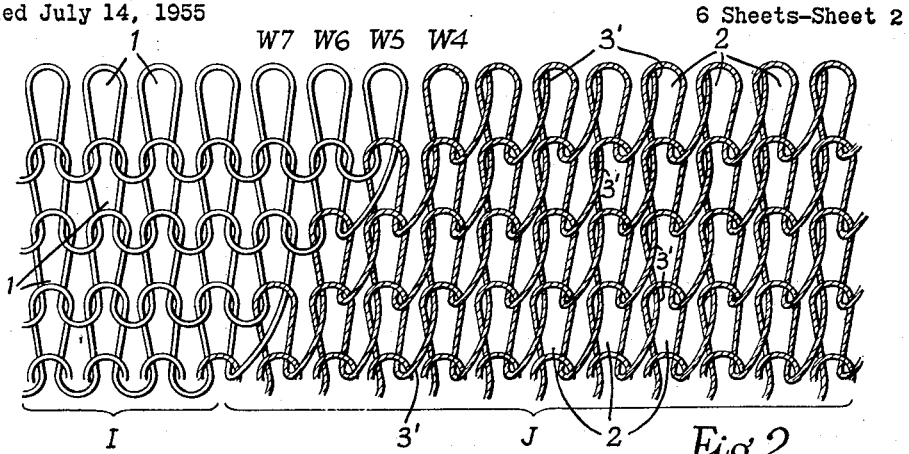

In the accompanying drawings:

Figure 1 represents, to a greatly magnified scale, the back face of a fragmentary portion of a simple form of the improved fabric structure comprising coursewise spaced portions of plain weft knitted fabric and an intervening portion of warp knitted fabric, this figure showing one of the many ways in which such weft and warp knitted portions can be joined, Figure 2 similarly illustrates the back face of a structure in which warp knitted fabric is so incorporated as to produce a diagonal stripe, Figure 3 shows a fragmentary portion of weft knitted plain fabric which has a fashioned selvedge and adjoins a warp knitted eyelet structure produced from two sets of warp threads, as will be hereinafter described.

Figure 12:
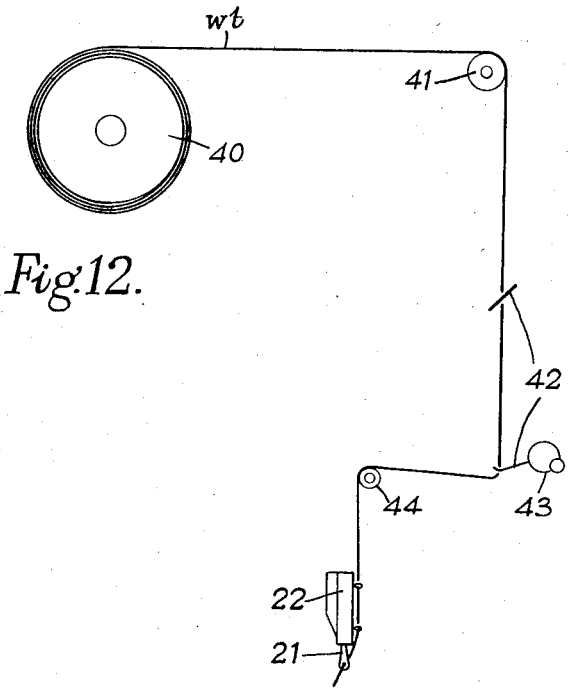
Figure 13:
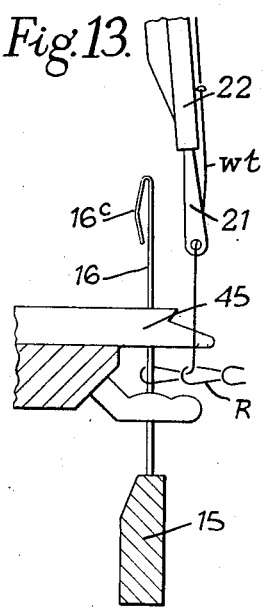
Figure 14:
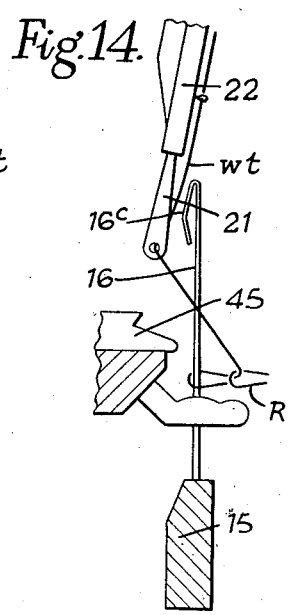
Figure 15:
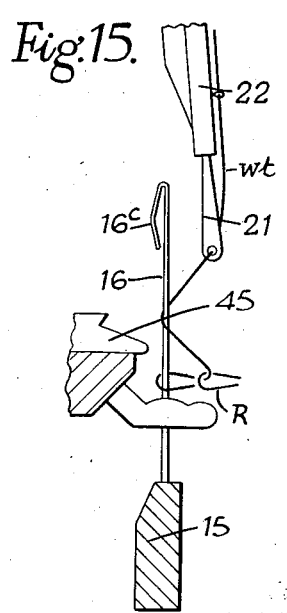

Figures 4–7 depict various forms of weft knitted garments patterned by warp knitted portions, sections or areas of respectively different shapes, Figure 8 is a diagrammatic general front view of a portion of a knitting machine capable of producing the fabric structures and garments shown in Figures 1–7, Figure 8a is a diagram illustrating extents of relative movements of weft carrier stops and warp guide bars of such a machine, Figure 9 is a detail front elevational view of the mechanism embodied in such machine for imparting to a warp guide bar its required movements, Figure 10 is a detail side view, as seen in the direction of the arrow in Figure 9, of one of the cam-operated levers employed for oscillating the guide bar rod, Figure 11 is a similar detail side view of one of the levers by which the warp guide bar is rigidly connected to the said guide bar rod, Figure 12 illustrates, in purely diagrammatic fashion, the means whereby warp threads are supplied to the warp thread guides, and Figures 13–15 are three part-sectional detail views illustrating the motion of a warp guide bar.

Like parts are designated by similar reference characters throughout the drawings.

In the fragment of the fabric structure depicted in Figure 1, there are two portions A and B of weft knitted fabric spaced apart in a coursewise direction, and an intervening portion C of warp knitted fabric. Each of the spaced portions A and B is comprised wholly of plain knitted loops 1, shown unshaded, whereas the portion C consists of plain 1 x 1 warp loops 2 which are differentiated from the weft knitted loops by virtue of being shaded. The portion C is produced with the lap "round the needle," and the under laps, i.e. the laps 3 of the warp threads at the back of the fabric, extend across one needle wale only and are made by racking alternately in opposite directions in successive courses. Thus, the general directions of these laps may be seen by noting how, for instance, the particular warp thread indicated by the numeral 4 laps at D$w'$ (that is course D, wale $w'$) E$w$, F$w'$, G$w$ and H$w'$. The adjoining weft and warp knitted portions A and B, and C, are knitted of contrastingly coloured yarns. In each of the needle wales $w^2$ and $w^3$ where the two types of knitting adjoin there are weft knitted loops 1 at alternate courses interengaged with warp loops 2 at the intervening courses. Thus, loops of the two types of knitting overlap, in this example, to the extent of only a single needle wale. It is to be clearly understood that this represents only one of numerous ways of joining the warp and weft knitted portions.

Turning now to Figure 2, it will be seen that a portion I of weft knitted fabric consisting wholly of plain knitted loops 1 adjoins a portion J of warp knitted fabric made by racking a single warp guide bar always in the same direction, this bar lapping in front of the needles to form open laps and behind the said needles to produce diagonal under laps 3'. All of the under laps 3' in this case accordingly extend in the same direction. The join depicted in Figure 2 is a particularly neat one and, of course, extends obliquely over a plurality of needle wales, such as those indicated at $w^4$, $w^5$, $w^6$ and $w^7$. Thus, the proportion of plain weft knitted loops 1 to warp loops 2 varies in these needle wales.

The fabric structure illustrated in Figure 3 comprises a weft knitted plain portion K which has a fashioned selvedge L and adjoins a portion of warp knitted fabric M made from two sets of warp threads manipulated by front and rear guide bars provided in the machine upon which the structure is produced. For convenience in illustration in Figure 3, the plain knitted loops 1 of the weft knitted fabric K are left unshaded, the warp loops 2$a$ formed of the threads of the set manipulated by the front guide bar are shown black, and the warp loops 2$b$ formed of the second set of threads manipulated by the rear guide bar are shaded. Accordingly, the black loops 2$a$ are seen on the front face of the fabric whilst the black underlaps 3$a$ are dominant on the back of the fabric, that is to say the face thereof displayed in Figure 3. When the shaded warp loops 2$b$ are knitted by needles functioning also to take and knit black warp threads, the said loops show at the back of the fabric. The structure in this example has therein eyelets such as 5 produced by omitting to thread up certain of the guides in either guide bar. Moreover, it will be observed that in case of both the black underlaps 3$a$ and the shaded underlaps 3$b$, these are made by racking the relevant guide bar alternately in opposite directions in successive courses, sometimes to the extent of one needle wale only but at other times across two needle wales (see the bottom right-hand portion of Figure 3). Thus, the two intermeshed eyeletted webs of the warp knitted fabric M, fabricated from two series of warp threads, includes 1 x 1 as well as 2 x 1 warp knitting.

More complex structures can, of course, be produced on a machine equipped with two or more and anything up to, say, eight guide bars.

With regard to the or each weft knitted portion of the improved fabric, this may be either plain, as shown in the drawings, or plain or fancy rib or purl or any desired combination of these basic weft knitted structures. The weft knitted fabric, moreover, may incorporate fancy effects such as drop-stitch (mock-rib) effects, float-stitch (press-off) effects, stitch selection or jacquard patterns or designs, tuck stitch (loop accumulation) effects, held stitch effects, lace (needle loop transfer), pelerine, fleecy or racked stitches, and so on. It is also within the scope of the invention for an interlock type of weft knitted fabric, or even for an intarsia weft fabric to adjoin warp knitted fabric-coursewise.

Various warp designs may be incorporated into the improved knitted structure by imparting varying lapping movements to the warp threads. Thus, the or each warp knitted portion or area of the fabric may be either of the "close" type in which all loops are recurringly interlooped so that no openings occur, or of the "open" type wherein the warp wales are connected at intervals only so that they produce net-like designs. If a warp knitted portion or area is to be of the close type it may comprise either (a) plain laps made on a group of needles of a single set by the aid of one or more corresponding groups of warp thread guides, or (b) ribbed laps made on groups of two sets of needles with the assistance of one or more groups of guides, or (c) knock-off laps similar to (a) except that some laps are not cleared until one or more other laps have been made, or (d) knop laps produced on groups of two sets of needles, one set knitting continuously and the other set at predetermined intervals only. Yet another form of close warp fabric which may be adopted is known in the art as single tricot, being made on one group of needles with two full sets of warp threads, each set making similar laps but in opposing directions. If, on the other hand, a warp knitted portion is to be of an open character it may consist of pillar or chain or any other appropriate net. Other classes of warp fabric, such as tuck, crochet, fleecy, plush and racked warp designs, may also be combined with weft knitted fabric as aforesaid.

Although the warp knitted effects may be ancillary to the weft knitted portions or areas, or vice versa, it is generally within the scope of the invention to intersperse the two types of knitting in the form of blocks, panels, bands, stripes and the like in any desired manner throughout the fabric or article.

Figure 4:
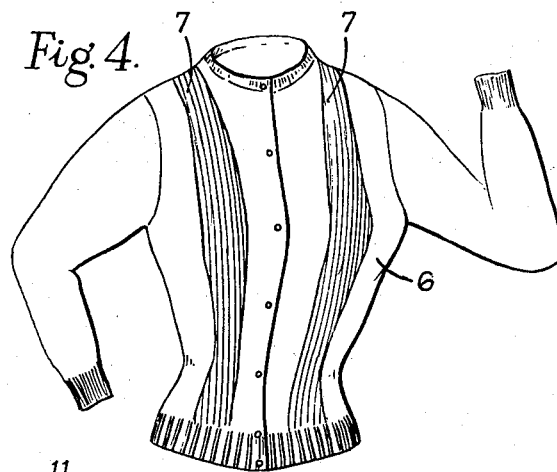
Figure 5:
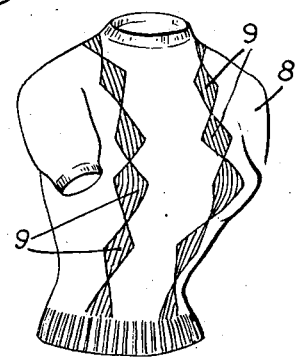
Figure 6:
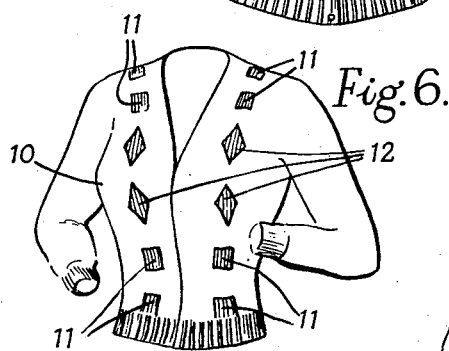
Figure 7:
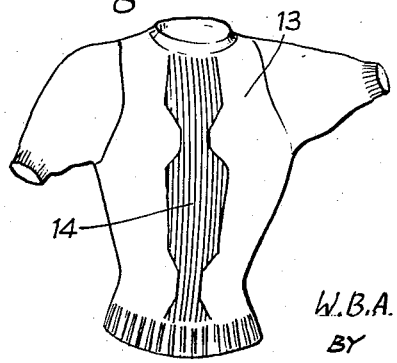

The warp knitted portions, sections or areas of the improved fabric may, in fact, assume a wide variety of different shapes and forms. For example, they may consist of blocks or similar solid effects spaced walewise by intervening portions of weft knitted fabric in which instance walewise extending warp threads connecting the spaced effects would float up the back of the fabric—over the weft knitted portions. Alternatively, the warp knitted portions or areas may extend uninterruptedly throughout the walewise extent of the fabric in the form of straight or zig-zagged panels: in this case the warp threads are taken and knitted continuously throughout the production of the fabric, thereby avoiding thread wastage. Examples of garments made in accordance with the invention are illustrated in Figures 4–7. Figure 4 depicts a lumber jacket 6 in which the unshaded areas are weft knitted and the shaded areas represent solid warp knitted panels 7 which extend uninterruptedly from the neck to the ribbed waist portion of the garment. Figure 5 shows a sweater 8 incorporating, within the weft knitted body, walewise extending successions of solid warp knitted diamonds 9. Figure 6 illustrates a mainly weft knitted cardigan 10 patterned by solid warp knitted blocks 11 and diamonds 12 which are spaced walewise and are connected at the back of the fabric by walewise floating warp threads. Figure 7 shows a raglan sleeve sweater 13 patterned at the front by a central warp knitted panel 14 of varying width.

Garments of the character just described may be either fully fashioned or cut to shape. It is desirable when fashioning, however, that the warp knitted areas shall be spaced inwards at least 1" from the selvedge.

In accordance with an optional feature of the invention, and with the aim of still further enhancing the appearance of the improved knitted fabric, warp knitted effects in the nature of wrap or lap striping (embroidery) designs may, if desired, be incorporated in one or more or all of the weft knitted portions or areas.

In practicing the method of knitting provided by this invention, a weft thread may conveniently be supplied to the or each appropriate group of needles by means of a weft thread carrier adapted to be traversed back and forth between stops, whereas individual warp threads are lapped around the needles of an adjoining group or groups by means of warp thread guides provided on a bar or bars adapted to be moved in such a way as to swing the guides to and fro across the needle line conjointly with lateral displacement of the guides relatively to the needles.

By varying the extents of the traversing movements of the weft thread carriers and shogging the warp guide bars, zig-zag and like effects can be readily produced.

In Figure 8, the needle bar of a machine for carrying out the improved method is diagrammatically represented at 15, the bearded needles fitted in the bar being indicated at 16. The machine is equipped with weft thread carriers 17 which are traversible to and fro along a carrier rod 18 and are each arranged to supply a weft thread to a group of the needles 16. Two such groups of needles, spaced apart are indicated at 16a in Figure 8. In fact, the weft thread carriers 17 are operable as for producing intarsia work, the extents to which they are traversed being variable, as occasion demands, by appropriate adjustments of yarn carrier stops 19 effected by screw-boxes, traverse wheels or equivalent conventional devices. Thus, for instance, the stops 19 may be in the form of, or associated with, tapped housings mounted upon left and right-hand lead screw portions of or combined with a rod 20. Accordingly, by turning the rod 20 in the appropriate direction a predetermined angular distance, the stops 19 of each pair are caused to move a commensurate distance towards each other suchwise as to reduce the extents of the traverses of the corresponding weft thread carrier 17, whereas reverse rotation of the rod 20 causes the stops 19 to move away from one another to increase the extents of the said traverses. In this way, weft knitted areas of fabric produced on the machine can be narrowed or widened according to requirements.

A set of warp thread guides 21, fitted in a guide bar 22, is provided for supplying individual warp threads to the group 16b of the needles 16, arranged between the two groups 16a. As will be seen, the bar 22 is mounted at its ends by depending arms 23 rigidly secured upon a guide bar rod 24. More than one guide bar similarly carried may, of course, be provided if desired. The rod 24 is both turnable about its axis to swing the guide bar 22 back and forth across the line of needles 16, i.e. at right angles to the needle bar 15, and also movable to and fro parallel with respect to the said bar. The back and forth (oscillatory) movements of the guide bar rod 24 enable the warp thread guides 21 to be passed to the rear and the front of the needles, whereas the to and fro movements determine the direction and extent of the laps of the warp threads. Thus, as will be appreciated, by appropriately correlated movements of the weft thread carriers 17 and of the guide bar or bars such as 21, the correct overlap of weft and warp knitted areas can be obtained notwithstanding variations in the widths of these areas.

An example of such movements is illustrated in Figure 8a in connection with the production of fabric involving the use of two guide bars. Assume that each guide bar is lapped in one direction for a plurality of courses and then in the opposite direction for an equal number of courses, then it would be necessary to rack the weft carrier stops 19 in one sense for several courses and in the opposite sense for an equal number of courses. In Figure 8a, where weft knitted fabric is designated N and warp knitted fabric O, the movement of the first guide bar is indicated at P and the corresponding movement of the second guide bar at Q, it being understood that these movements are equal to those of the weft carrier stops 19.

The back and forth movements of the or each guide bar 22, at right angles to the needle bar 15, are effected through the medium of one or more levers, such as that indicated at 25 in Figures 9 and 10. The or each lever 25 is furnished with a follower roller 26 arranged in contact with a continuously rotated heart-shaped cam 27 by which the said lever is oscillated. The lever 25 is keyed, by a key 28 located in a keyway, to the guide bar rod 24 so that although this rod is free to slide longitudinally relatively to the said lever, any turning movement imparted to the latter by the cam 27 will be transmitted to the rod 24 and hence also, via the arms 23, to the guide bar 22.

For imparting lonigtudinal movements to the guide bar rod 24 to varying extents, parallel to the needle bar 15, and thereby producing the required "overlaps" and "under laps," a selector device such, for example, as a pattern wheel or a chain may be provided. In the specific example shown in Figure 9, the pattern wheel, indicated at 29, is adapted to be continuously rotated at any appropriate speed from the main cam shaft 30 of the machine (e.g. a converted "Cottons Patent" type machine) through the medium of bevel gearing 31, 32, a vertically disposed drive-transmitting shaft 33 and worm gearing 34, 35. The pattern wheel is furnished with studs (not shown) of different heights, and these studs are arranged to act upon a small roller 36 mounted at the outer end of a slide 37 the inner end of which is fitted with an abutment 38 in the form of an adjustable screw. This abutment acts on the adjacent end of the guide bar rod 24 which is influenced by a spring such as 39 arranged at either end thereof. This spring incidentally takes up any slackness in the movements. Each time a stud acts on the roller 36, the rod 24 will be shifted longitudinally, against the spring action and to an extent determined by the height of the stud on the pattern wheel. Conversely, whenever the roller drops off a stud, the rod will move under the spring action in the opposite direction. The arrangement illustrated is such that four successive studs are presented to the roller 36 during each revolution of the main cam shaft 30. Thus, there are four selections per course for determining the over lap (two studs) and the under lap (two studs). The slide 37 and hence also the guide bar rod 24 can, therefore, be shifted four times per course. Since the guide bar 22 is connected with the rod 24 it will move longitudinally either behind the needles 16 for underlapping or in front of the needles for overlapping. From the foregoing description it will be appreciated that there are two of such movements per course, viz. under lap and over lap, the motions being so timed that the overlap occurs with the guide bar in front of the needles, and the under lap when the bar is behind the needles.

In the case of a machine equipped with a plurality of guide bars, there would be one pattern wheel or chain and one guide bar rod to each guide bar: all the pattern wheels or chains, however, would be rotated from the same shaft 30.

The individual warp threads *wt* are wound under even tension onto a warp roller 40 (see Figure 12) having either a positive or a negative let-off action. If a positive let-off is adopted, a stable fabric must be made, i.e. one wherein every course requires the same amount of yarn from the warp thread guides 21 of the or each series, as the case may be. In the case of a negative let-off, the rollers holding the warp threads are frictionally restrained from letting off the warp and the latter tends to be pulled off. In the specific arrangement illustrated in Figure 12, the threads from the warp roller 40 are passed over a positively driven roller 41, and the roller 40 is frictionally restrained. In this way the diminishing circumference of the warp threads on the rollers 40 as it empties is compensated for. From the driven roller 41, the threads *wt* pass at 42 through any appropriate type of stop motion and a tensioning device 43. The stop motion is of a type adapated to take up any slack in the threads. Finally, the threads in this arrangement extend over a free roller 44 and down into and through the eyes of the guides 21.

In Figure 13, a typical needle 16, a threaded-up warp thread guide 21, the associated sinker or divider 45 and the loop structure R being produced are all shown in a rest position. From this position, the warp guide bar 22, whilst still behind the needles is racked in the desired direction over one or more needle spaces to form the required under-laps of the threads *wt*. Next, the warp thread guides 21 are swung forwards between the needles 16 to positions in front of the needle beards 16c as represented in Figure 14. The guides 21 are then racked or lapped over one needle only in either direction, according as to whether an "open" or a "closed" lap is required. Finally, the guides 21 are swung back between the needles 16 to assume their original positions (see Figure 15.) As a result, the threads *wt* are laid around every needle in front of which the guides were racked. From the position depicted in Figure 15, the needle bar 15, and hence also the needles 16, are lowered and the beards 16c of the latter are pressed against the front edge of the sinker bar so as to land the old loops onto the beards. Further descent of the needles results in the old loops being knocked over the new loops in the conventional manner.

It is to be clearly understood that the sinker and dividing action relating to those needles upon which warp fabric is knitted is not necessary. As, however, it is impracticable to stop the necessary action of those sinkers or dividers associated with the groups of the needles by which weft knitted fabric is produced, all of the sinkers and dividers are actuated in the same manner as in a normal "straight bar" knitting machine.

By omitting to thread up certain of the warp thread guides of two or more series different warp knitted effects, such as shell design and open work can be produced, thereby enhancing the patterning scope. Moreover, by using a plain weft of one colour only, and multi-coloured warp threads the patterning scope is practically infinite.

A problem arising when producing warp knitted fabric in combination with weft knitted fabric on a straight-bar knitting machine concerns the regulation of stitch length as the sinkers or dividers cannot be relied on to assist in such regulation because there are no bars of yarn between adjacent needles. For this reason the tension on the warp threads being fed by the guides is permitted to determine the length of the loops being drawn by the needles. Accordingly, by suitably varying the speed of let-off of the warp roller 40, the required degree of tension can be readily obtained. This tension may even be varied for patterning purposes, for example when producing open work warp adjacent to close knitted weft.

I claim:

1. Fabric comprising interknitted weft and warp knitted portions in coursewise adjoining relation of contrastingly coloured threads suchwise as to produce solid colour effects, loops of the said two types of knitting being incorporated in at least one and the same wale at the places where the said portions of weft and warp knitting adjoin.

2. Fabric comprising spaced weft knitted portions and intervening warp knitted portions in coursewise adjoining relation, said warp knitted portions extending uninterruptedly throughout the walewise extent of the fabric in the form of panels, and loops of the two types of knitting being incorporated in at least one and the same wale at each of the places where the said portions of weft and warp knitting adjoin.

3. Fabric comprising at least two weft knitted portions spaced apart in a coursewise direction, and an intervening portion of warp knitted fabric consisting of individual warp threads formed into plain warp loops, the laps, of the said warp threads at the back of the fabric extending in opposite directions alternately in successive courses across one wale only, and there being, in each of the wales where the two types of knitting adjoin, weft knitted loops at alternate courses interengaged with plain warp loops at the intervening courses.

4. Fabric comprising a weft knitted portion, and a coursewise adjoining warp knitted portion having laps and diagonally extending under laps, the join between the said two portions extending obliquely over a plurality of wales in each of which latter there are weft knitted loops and warp loops in varying proportions.

5. Fabric comprising a weft knitted portion with a fashioned selvedge, and a coursewise adjoining warp knitted portion made from two sets of individual warp threads, the loops formed of one set of warp threads appearing on the front face of the fabric whilst the under laps of the same warp threads are dominant on the back of the fabric, and the under laps of both sets of warp threads extending alternately in opposite directions in successive courses, at some places to the extent of one wale only and at other places across two wales, both weft knitted loops and warp loops being incorporated in at least one and the same wale at the location where the weft and warp knitted portions adjoin.

References Cited in the file of this patent

UNITED STATES PATENTS

| | | |
|---|---|---|
| 2,021,132 | Morris et al. | Nov. 19, 1935 |
| 2,073,242 | Lawson | Mar. 9, 1937 |
| 2,113,200 | Sachsenmaier | Apr. 5, 1938 |
| 2,120,522 | Lambach | June 14, 1938 |
| 2,229,105 | Lombardi | Jan. 21, 1941 |
| 2,588,718 | Green | Mar. 11, 1952 |
| 2,610,496 | Kostopoulos | Sept. 16, 1952 |
| 2,687,631 | Lombardi | Aug. 31, 1954 |
| 2,707,381 | Lombardi | May 3, 1955 |
| 2,777,311 | Lombardi | Jan. 15, 1957 |

FOREIGN PATENTS

| | | |
|---|---|---|
| 671,932 | Great Britain | May 14, 1952 |